US010638854B2

(12) United States Patent
Wyman et al.

(10) Patent No.: US 10,638,854 B2
(45) Date of Patent: May 5, 2020

(54) COLLAPSIBLE LAYERED CUSHION

(71) Applicant: Skydex Technologies, Inc., Centennial, CO (US)

(72) Inventors: Ethan Thomas Wyman, Lakewood, CO (US); Daniel Antonio Feighery, Denver, CO (US); Eric William Sugano, Arvada, CO (US); Peter Maurice Foley, Castle Rock, CO (US); Thomas Christopher Manney, Bennett, CO (US); Collin Metzer, Highlands Ranch, CO (US); Gerald Michael Buchen, Parker, CO (US); John Marcell Danis, Centennial, CO (US)

(73) Assignee: SKYDEX TECHNOLOGIES, INC, Centennial, CO (US)

( * ) Notice: Subject to any disclaimer, the term of this patent is extended or adjusted under 35 U.S.C. 154(b) by 492 days.

(21) Appl. No.: 15/296,312

(22) Filed: Oct. 18, 2016

(65) Prior Publication Data

US 2017/0027336 A1    Feb. 2, 2017

Related U.S. Application Data

(63) Continuation of application No. 14/622,642, filed on Feb. 13, 2015, now Pat. No. 9,492,018, which is a
(Continued)

(51) Int. Cl.
*A47C 27/15* (2006.01)
*A47C 27/05* (2006.01)
(Continued)

(52) U.S. Cl.
CPC .............. *A47C 27/15* (2013.01); *A42B 3/127* (2013.01); *A47C 27/001* (2013.01);
(Continued)

(58) Field of Classification Search
CPC ... A47C 21/046; A47C 27/001; A47C 27/006; A47C 27/007; A47C 27/053;
(Continued)

(56) References Cited

U.S. PATENT DOCUMENTS 3,231,454 A * 1/1966 Williams .............. B65D 81/03
428/132
3,280,410 A * 10/1966 Propst .................... A47C 4/54
267/117
(Continued)

FOREIGN PATENT DOCUMENTS

CA    2162053 A1    12/2003
CN    98813957       4/2001
(Continued)

OTHER PUBLICATIONS

International Searching Authority, International Search Report, PCT/US2011/037586, dated Feb. 9, 2012, 3 pages.
(Continued)

*Primary Examiner* — Nicholas F Polito
(74) *Attorney, Agent, or Firm* — Holzer Patel Drennan

(57) ABSTRACT

A layered cushion that may be fully disassembled for easy cleaning is disclosed herein. The sleep system is durable and fire retardant. The layered cushion may include a foam layer, a layer of void cells, and a cover. The foam permits fluids to move freely there through and contours to a user's body to maximize comfort and reduce interface pressure. The reticulated foam layer resists compression set and thermosetting. The layer of void cells also permits fluids to move freely there through and provide additional support to the user's body. The individual void cells of the void cell layer are perforated to allow the transmission of fluids there through. The cover couples the other layers together to form the layered cushion and prevents the layers from deteriorating.
(Continued)

The cover is removable to permit cleaning each of the layers independently.

21 Claims, 12 Drawing Sheets

Related U.S. Application Data continuation of application No. 13/854,869, filed on Apr. 1, 2013, now Pat. No. 8,990,987, which is a continuation of application No. PCT/US2012/041306, filed on Jun. 7, 2012.

(60) Provisional application No. 61/494,089, filed on Jun. 7, 2011.

(51) Int. Cl.
| | |
|---|---|
| *A47C 27/06* | (2006.01) |
| *A47C 31/10* | (2006.01) |
| *A47C 27/00* | (2006.01) |
| *A47C 27/14* | (2006.01) |
| *B29D 99/00* | (2010.01) |
| *B32B 3/12* | (2006.01) |
| *A42B 3/12* | (2006.01) |

(52) U.S. Cl.
CPC .......... *A47C 27/007* (2013.01); *A47C 27/053* (2013.01); *A47C 27/065* (2013.01); *A47C 27/148* (2013.01); *A47C 31/105* (2013.01); *B29D 99/0092* (2013.01); *B32B 3/12* (2013.01); *Y10T 428/233* (2015.01); *Y10T 428/234* (2015.01)

(58) Field of Classification Search
CPC ..... A47C 27/065; A47C 27/084; A47C 27/10; A47C 27/142; A47C 27/144; A47C 27/148; A47C 27/15; A47C 27/20; A47C 31/105; A47G 9/1009; A47G 2009/1018; B32B 7/04; B32B 3/12; B32B 5/18; B29D 99/0092; A42B 3/127; Y10T 428/233; Y10T 428/234
USPC ... 5/630, 632, 636, 644, 420, 701, 706, 709, 5/710, 727, 728, 729, 652, 653, 654, 5/655.3, 655.9, 901, 652.1, 724; 267/117, 267/142, 145; 297/452.21, 452.24, 297/452.42, 452.45, 452.46, 452.48, 297/452.55, 452.57, 452.65; 428/72, 73, 428/116, 178
See application file for complete search history.

(56) References Cited

U.S. PATENT DOCUMENTS

| | | | |
|---|---|---|---|
| 5,255,404 A * | 10/1993 | Dinsmoor, III | A47C 27/144 5/654 |
| 5,638,565 A * | 6/1997 | Pekar | A47C 4/54 5/653 |
| 6,510,573 B1 * | 1/2003 | Grabe | A47G 9/1027 5/490 |
| 7,574,760 B2 * | 8/2009 | Foley | A47C 7/021 5/655.7 |
| 7,946,655 B2 * | 5/2011 | Hsu | A47C 7/746 297/452.46 |
| 9,492,018 B2 * | 11/2016 | Wyman | A47C 27/15 |
| 2003/0205920 A1 * | 11/2003 | Sprouse, II | A47C 4/54 297/219.1 |

FOREIGN PATENT DOCUMENTS

| | | |
|---|---|---|
| CN | ZL94192458-0 | 10/2003 |
| CN | 101959443 A | 1/2011 |
| EP | 0168975 A2 | 1/1986 |
| EP | 916277 B1 | 12/1998 |
| EP | 605485 B1 | 6/1999 |
| EP | 697825 B1 | 8/2001 |
| HK | 1035224 A1 | 5/2004 |
| JP | 07-243796 A | 9/1995 |
| JP | 06-194490 A | 7/1996 |
| JP | 3471011 B | 9/2003 |
| JP | 3887705 B | 12/2006 |
| KR | 224293 B1 | 7/1999 |
| KR | 329882 B1 | 3/2002 |
| KR | 329883 B1 | 3/2002 |
| TW | 95-59815 | 4/1993 |
| TW | N1-59815 | 4/1993 |
| WO | 00-33015 A2 | 6/2000 |
| WO | 09-075922 A1 | 6/2009 |

OTHER PUBLICATIONS

International Searching Authority, Written Opinion of the International Searching Authority, PCT/2011/037586, dated Feb. 9, 2012, 3 pages.
International Searching Authority, International Search Report, PCT/US2011/064449, dated Jul. 24, 2012, 5 pages.
International Searching Authority, Written Opinion of the International Searching Authority, PCT/2011/064449, dated Jul. 24, 2012, 4 pages.
International Searching Authority, International Search Report, PCT/US2012/041306, dated Dec. 27, 2012, 6 pages.
International Searching Authority, Written Opinion of the International Searching Authority, US2012/041306, dated Dec. 27, 2012, 6 pages.

\* cited by examiner

COLLAPSIBLE LAYERED CUSHION

CROSS-REFERENCE TO RELATED APPLICATIONS

The present application is a continuation application of U.S. application Ser. No. 14/622,642, entitled "Collapsible Layered Cushion" and filed on Feb. 13, 2015, which claims benefit of priority to U.S. application Ser. No. 13/854,869, entitled "Collapsible Layered Cushion" and filed on Apr. 1, 2013, which claims benefit of priority to International Application No. PCT/US2012/041306, entitled "Washable Layered Cushioned" and filed on Jun. 7, 2012, which claims benefit of priority to U.S. Provisional Patent Application No. 61/494,089, entitled "Washable Layered Sleep System" and filed on Jun. 7, 2011, which is specifically incorporated by reference herein for all that it discloses and teaches.

BACKGROUND

Mattresses are used in a wide variety of environments, such as in the home, in hotels, in hospitals, in sport facilities, in security facilities, in emergency stations, during camping, and for military applications. The mattresses provide comfort and impact protection to a user. Additionally, some mattresses may be portable and provide a barrier between the user's body and one or more objects that would otherwise impinge on the user's body in a variety of settings. Similarly, various cushions provide similar benefits to a user as a seating surface or lining of a protective device (e.g., a helmet or body pads).

A variety of structures and materials may be used to make a mattress or other padding. For example, a pocketed spring mattress may contain an array of close-coupled metal springs that cushion the user's body from a bed frame. Additionally, an array of close-coupled closed-cell air and/or water chambers may be used, for example, in air and water mattresses. Further examples include convoluted open or closed cell polyurethane foam, latex foam, and inversely convoluted foam.

However, conventional cushions, particularly mattresses in camping, military, and hospital applications, are difficult to clean between uses, and contaminants often accelerate the deterioration of such mattresses. The cushions often retain fluids and trap particles or other foreign objects. Further, many portable or reusable cushions are designed to maximize transportability and/or storability rather than comfort. For example, a conventional mattress utilizing an array of coupled cells or springs provides an increasing resistance to deflection with deflection of the coupled cells or springs at a point of contact with the user's body. The increasing resistance to deflection may cause pressure points on the user's body (e.g., at a user's shoulders and hips) that protrude into the mattress more than other portions of the user's body. Additionally, conventional foam mattresses may result in discomfort for a user caused by excess compression or thermosetting. Further, conventional mattresses may be flammable or otherwise highly susceptible to fire hazards.

SUMMARY

Implementations described and claimed herein address the foregoing problems by providing a layered cushion comprising: a foam layer; a void cell layer, wherein the foam layer substantially collapses at a lower pressure than the void cell layer; a separation layer configured to be oriented between the foam layer and the void cell layer; and a cover configured to envelop the foam layer and the void cell layer. The cover constrains the foam layer and the void cell layer in a selected position and orientation when enveloping the foam layer and the void cell layer. The foam layer, the void cell layer, and the cover are removable from one another.

Implementations described and claimed herein address the foregoing problems by further providing a method of assembling a layered cushion comprising: positioning a foam layer adjacent a first surface of a separation layer and within a cover; positioning a void cell layer adjacent a second surface of the separation layer and within the cover, wherein the foam layer substantially collapses at a lower pressure than the void cell layer; and closing the cover to envelop the foam layer and the void cell layer. The foam layer, the void cell layer, and the cover are removable from one another.

Implementations described and claimed herein address the foregoing problems by still further providing a washable layered mattress comprising: a fluid permeable foam layer; a fluid permeable void cell layer including a matrix of four or more void cells, wherein the foam layer substantially collapses at a lower pressure than the void cell layer; a separation layer oriented between the foam layer and the void cell layer; and a cover that envelops and constrains the foam layer and the void cell layer in a selected position and orientation. The foam layer, the void cell layer, and the cover are removable from one another.

Other implementations are also described and recited herein.

BRIEF DESCRIPTIONS OF THE DRAWINGS

DETAILED DESCRIPTIONS

Figure 1:
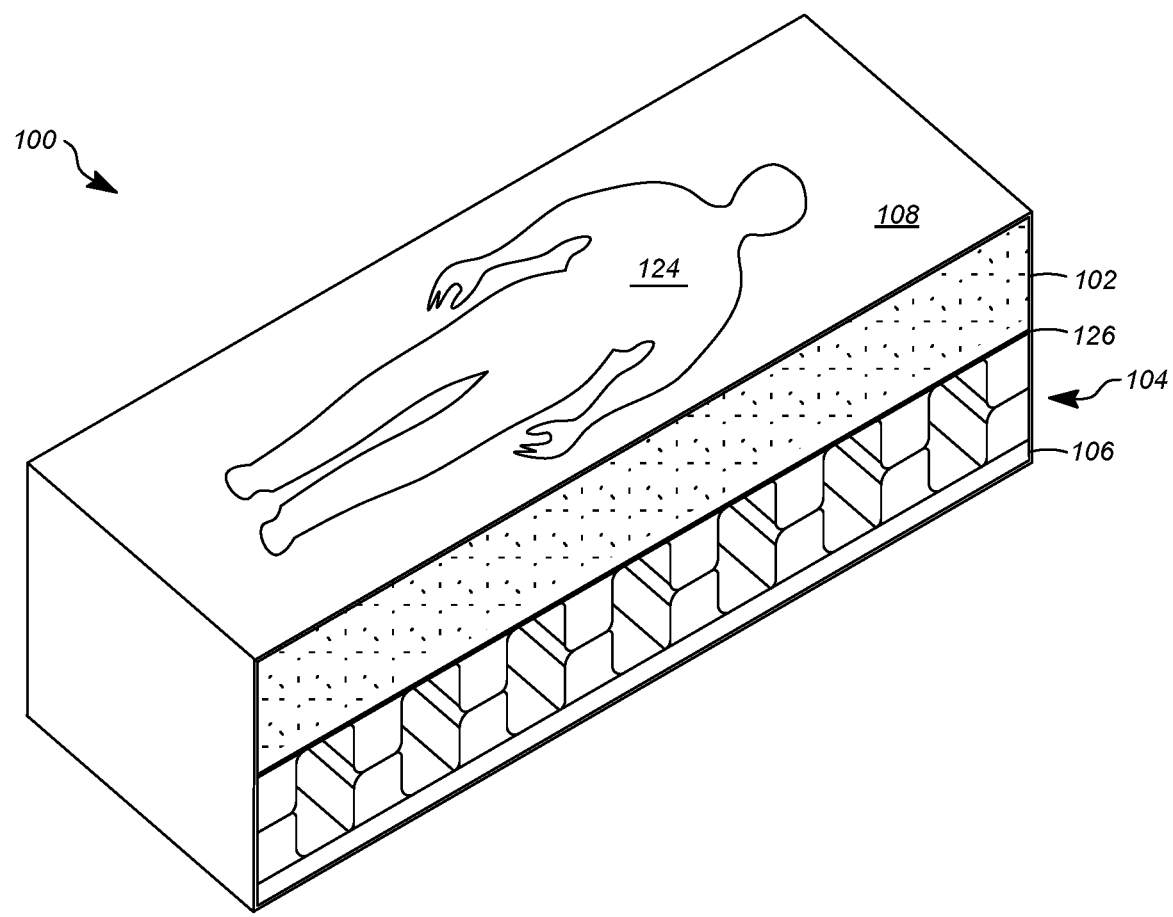
FIG. 1 illustrates a perspective cross-sectional view of an example washable layered mattress.

FIG. 1 illustrates a perspective cross-sectional view of an example washable layered mattress 100. The layered mattress 100 includes a foam layer 102, a separation layer 126, a layer of void cells 104, a structure layer 106, and a cover 108. Details of each of the individual component layers of the mattress 100 will be discussed in detail below. FIG. 1 is not drawn to scale.

The layered mattress 100 may sit atop a structural framework (not shown) that lifts the layered mattress 100 to a desirable height so that a user 124 may sit and/or lie upon the mattress 100 to comfortably rest and/or sleep. The component layers of the mattress 100 are specifically configured to be assembled and disassembled. This allows the individual component layers of the mattress 100 to be replaced without replacing the entire layered mattress 100. Further, each of the individual component layers of the mattress 100 are fluid permeable to enable easy cleaning of the layered mattress 100, either in an assembled or disassembled state, using water and/or a solution of water and a cleaning agent.

Figure 2:
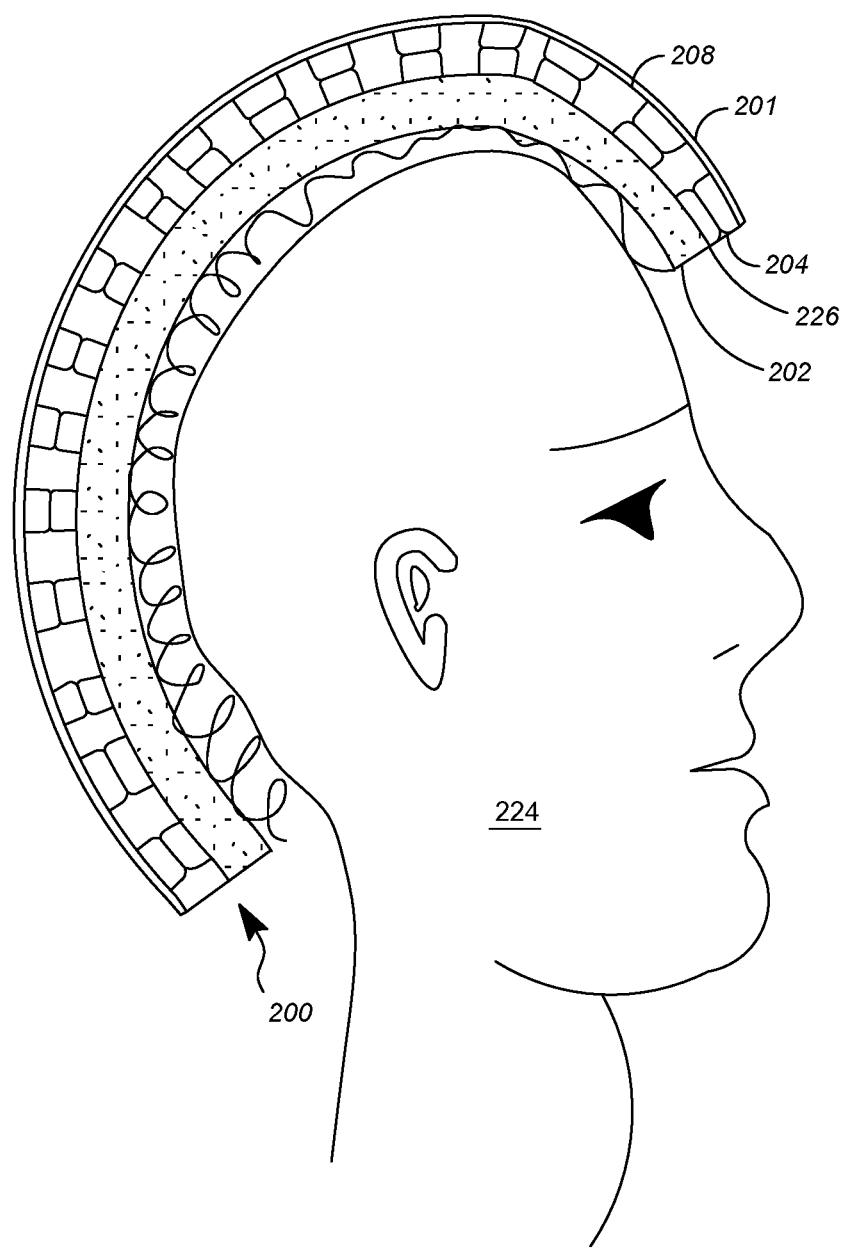
FIG. 2 illustrates an elevation cross-sectional view of an example helmet with a washable layered cushion therein.

FIG. 2 illustrates an elevation cross-sectional view of an example helmet 201 with a washable layered cushion 200 therein. The layered cushion 200 includes a foam layer 202, a separation layer 226, a layer of void cells 204, and a cover 208. Details of each of the individual component layers of the layered cushion 200 will be discussed in detail below. FIG. 2 is not drawn to scale.

The layered cushion 200 may be inserted and secured within the helmet 201 to comfortably cushion a user's head 224 from impacts. The component layers of the cushion 200 are specifically configured to be assembled and disassembled. This allows individual component layers of the cushion 200 to be replaced without replacing the entire layered cushion 200. Further, each of the individual component layers of the cushion 200 are fluid permeable to enable easy cleaning of the layered cushion 200, either in an assembled or disassembled state, using water and/or a solution of water and a cleaning agent.

Figure 3:
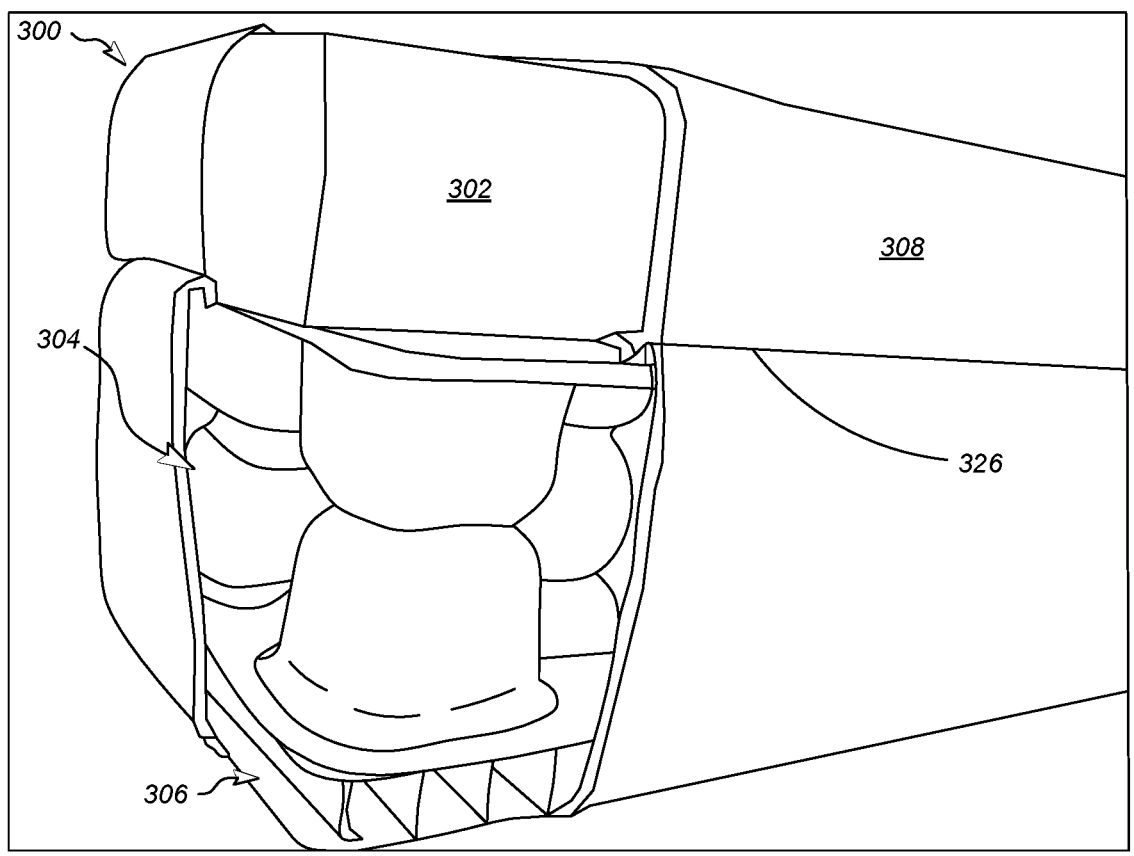
FIG. 3 illustrates a partial cross-sectional view of an example layered cushion.

FIG. 3 illustrates a partial cross-sectional view of an example layered cushion 300. The layered cushion 300 includes a foam layer 302 and a layer of void cells 304 with a separation layer 326 there between. The layered cushion 300 further includes a structure layer 306 and a cover 308 that at least partially encompasses the other component layers of the cushion 300. Further, the layered cushion 300 may include more or fewer layers or components as described herein. A portion of the cover 308 is missing to illustrate the component layers within the layered cushion 300.

The individual layers of the layered cushion 300 may be arranged in any order or manner. In an implementation, the cover 308 couples the other component layers together with the foam layer 302 providing, in conjunction with the cover 308, a user interface. The separation layer 326 may lie between the foam layer 302 and the layer of void cells 304 to prevent the foam layer 302 from collapsing into the individual cells of the layer of void cells 304. The structure layer 306 is the bottom-most layer of the layered cushion 300. The layered cushion 300 reduces pressure points and maximizes comfort while permitting the transmission of fluids and particles through and out of each of the individual layers for easy cleaning. Low pressure support provided by the foam layer 302 and high pressure support provided by the layer of void cells 304 creates a layered cushion 300 that contours to and supports a user's body and that is soft and comfortable.

The foam layer 302 is porous and has low density that permits the easy transmission of fluids there through. The foam layer 302 is formed with relatively few pores per inch, for example, 25 to 35 pores per inch to maximize the hygienic characteristics (e.g., the capability to transmits fluids there through) of the foam layer 302. The foam layer 302 may be made of, for example, urethane, an organic (e.g., polyolefin) or an inorganic (e.g., silicone-based) polymer, rubber, or any other material that is conformable, resilient, and has a porous structure that allows fluids and particles to move freely through the foam layer 302.

In one implementation, the foam layer 302 is a reticulated urethane foam, which has a high tear strength, satisfactory elongation, and satisfactory resiliency. Further, through thermal reticulation, the pore sizes of the reticulated urethane foam may be increased. In another implementation, the foam layer 302 may be a cushion with interconnected polymer extrusions wandering in a spaghetti-like or net pattern. Because the foam layer 302 is designed to permit the easy transmission of fluids there through, the foam layer 302 does not readily retain fluid or trap particles. As such, the foam layer 302 may be thoroughly cleaned between uses.

Many porous, low density foams are susceptible to degradation and combustion. Further, many such foams have low resistance to compression set. Conversely, the foam layer 302 is optimized to fight compression set, maximize durability, and minimize combustibility. The foam layer 302 may be treated to make the foam material fire retardant or resistant to ignition from an open flame. For example, an intumescing coating may be applied to the foam layer 302 to make it fire retardant. Alternatively or additionally, the foam layer 302 may be made from an inherently fire retardant reticulated urethane, which is treated with additives at the compounding stage. Further, the low density range of the foam layer 302, for example, 2.2 to 3.0 pounds per cubic foot, increases the resistance to compression set, and the relatively low pores per inch of the foam layer 302 permits fluid transmission through the foam layer 302. The resistance to compression set increases the durability of the foam layer 302 and allows for repeated use and cleaning of the layered cushion 300. Many types of foam soften in reaction to body heat, which may result in thermosetting of the foam. As such, in designing the foam layer 302, the average temperature of a human body and/or expected storage, transportation, and usage environment temperatures are considered to prevent thermosetting of the foam layer 302.

The foam layer 302 contours to the user's body to maximize comfort and interface pressure reduction. The foam layer 302 contours and molds to the shape of the user's body in reaction to the user's body heat and weight and returns to its original form once the pressure from the user's body is removed from the foam layer 302. The firmness of the foam layer 302 maximizes comfort and interface pressure reduction. For example, the foam layer 302 may be 2 inches thick with a 55 percent usable stroke, which represents the percentage of compression before the foam densifies, and have a 25 to 35 indentation force deflection rating.

The layer of void cells 304 includes cushioning cells or support units extending from one or more substantially planar surfaces. The layer of void cells 304 may be, for example, 3.2 inches thick with a 70 percent usable stroke. As a result, the layered cushion 300 has a high degree of compliance while being relatively compact. The cushioning cells (or void cells) are hollow chambers that may create a relatively constant force to resist deflection. In one implementation, the cushioning cells are tapered. Further, the cushioning cells may be hexagonal, hemispherical, hemiellipsoidal, conical, cubical, pyramidal, cylindrical, etc. However, other shapes configured to resist deflection due to compressive forces are contemplated. The layer of void cells 304 is generally made from materials that are elastically deformable under expected load conditions and will withstand numerous deformations without fracturing or otherwise degrading. Example materials include thermoplastic urethane, thermoplastic elatomers, styrenic co-polymers, rubber, Dow Pellethane®, Lubrizol Estane®, Dupont™ Hytrel™, ATOFINA Pebax®, and Krayton polymers.

In one implementation, the layer of void cells 304 includes a top substantially planar surface opposing a bottom substantially planar surface, each surface having one or more indentations forming cushioning cells. For example, the cushioning cells may have a 1.6 inches tall hemisphere with a 5-degree draft angle. The top surface links the cushioning cells extending from the top surface together, and the bottom surface links the cushioning cells extending from the bottom surface together. The cushioning cells extending from a given surface may be individually attached to that surface and not to each other. In the alternative, the cushioning cells may extend from a given surface and further attach to neighboring cushioning cells. A cushioning cell extending from the top surface meets an opposing cushioning cell extending from the bottom surface at a connection interface. The connection interface may be perforated to allow for the transmission of fluids through each of the cushioning cells in the layer of void cells 304. Additionally, the surface area of the top and bottom surfaces corresponding to each cushioning cell may be open to further permit the transmission of fluids through the layer of void cells 304. The open surfaces and perforations facilitate cleaning of the layer of void cells 304.

In another implementation, the individual cushioning cells are arranged in a top matrix and a bottom matrix. The top matrix extends from a top surface of a central binding layer, and the bottom matrix extends from a bottom surface of the central binding layer. In one implementation, the cushioning cells are filled with ambient air and closed or sealed to prevent fluids or particles from penetrating or becoming trapped. In another implementation, the cushioning cells are un-filled. Further, there may be one or more holes in the cushioning cells and/or central binding layer through which air or fluid may pass freely when the cushioning cells are compressed and de-compressed and/or to facilitate cleaning. In yet another implementation, the cushioning cells are filled with a foam or a fluid other than air. The foam or certain fluids may be used to insulate a user's body, facilitate heat transfer from the user's body to/from the layered cushion 300, and/or affect the resistance to deflection of the layered cushion 300.

In an implementation utilizing a central binding layer (not shown), the cushioning cells may compress independently of one another, within an independent deformation range to reduce the potential for pressure points on the user's body. The cushioning cells individually compress to distribute the weight of the user evenly. At least the material, wall thickness, size, and shape of each of the cushioning cells define the resistive force each of the cushioning cells can apply. For example, the layer of void cells 304 may have a 0.95 pounds per square inch activation or buckling load and a 0.78 pounds per square inch support force in the active deflection range. This allows the layer of void cells 304 to conform to the user's body with an even force on the user's body to maximize comfort and reduce the potential for pressure points on the user's body. For example, the layer of void cells 304 has a sufficient firmness to support a larger user (e.g., a user with a body weight greater than the 75th percentile) but also is capable of deforming and contouring to the body of a smaller user (e.g., a user with a body weight less than the 25th percentile). In another implementation, the layer of void cells 304 is a honeycomb structure.

Further, the layered cushion 300 achieves an optimal SAG factor, which represents the ratio of firmness between a foam layer and a secondary layer. For example, the layered cushion 300 may have a SAG factor of approximately 2 between the foam layer 302 and the layer of void cells 304, which is optimal for pressure ulcer prevention.

In still another implementation, the cushioning cells are arranged in a top matrix that extends from a top binding layer and a bottom matrix that extends from a bottom binding layer. The void cells that extend from the top binding layer meet the bottom binding layer and the void cells that extend from the bottom binding layer meet the top binding layer in an interdigitated manner. The interdigitated layer of void cells may be perforated where each cushioning cell meets the opposite binding layer to facilitate cleaning and allow the transmission of fluids there through.

The structure layer 306 provides system firmness and rigidity to the layered cushion 300 to maximize comfort and portability of the layered cushion 300. The structure layer 306 is planar and substantially rigid. The structure layer 306 evens the surface the layered cushion 300 is placed upon to maximize comfort to a user. Some implementations will not include the structure layer 306. The structure layer 306 may be made from any rigid material that does not retain fluids and that may be easily cleaned. For example, the structure layer 306 may be made of a plastic thermoplastic urethane. However, other materials including but not limited to metals, plastics, ceramics, and rubbers are contemplated to make the structure layer 306.

The cover 308 couples the layers, including the foam layer 302, the layer of void cells 304, and the structure layer 306, together in a desired position and orientation to form the layered cushion 300 and prevents the component layers from deteriorating as a result of exposure to contaminants and/or environmental factors. The cover 308 may be removable to facilitate cleaning of the component layers separately and the cover 308 may be machine washable. Further, the cover 308 may be inherently fire retardant as a result of the material makeup, coating, etc. For example, the cover 308 may be made from a blend of synthetic and natural fibers including but not limited to Dupont™ Nomex®, cotton, nylon, and other aramid fibers. In an implementation, the cover 308 and the separation layer 326 together includes a divider pocket to separate the foam layer 302 from the layer of void cells 304 and to provide further structure to the layered cushion 300 and to prevent the foam layer 302 from collapsing into the layer of void cells 304.

Figure 4:
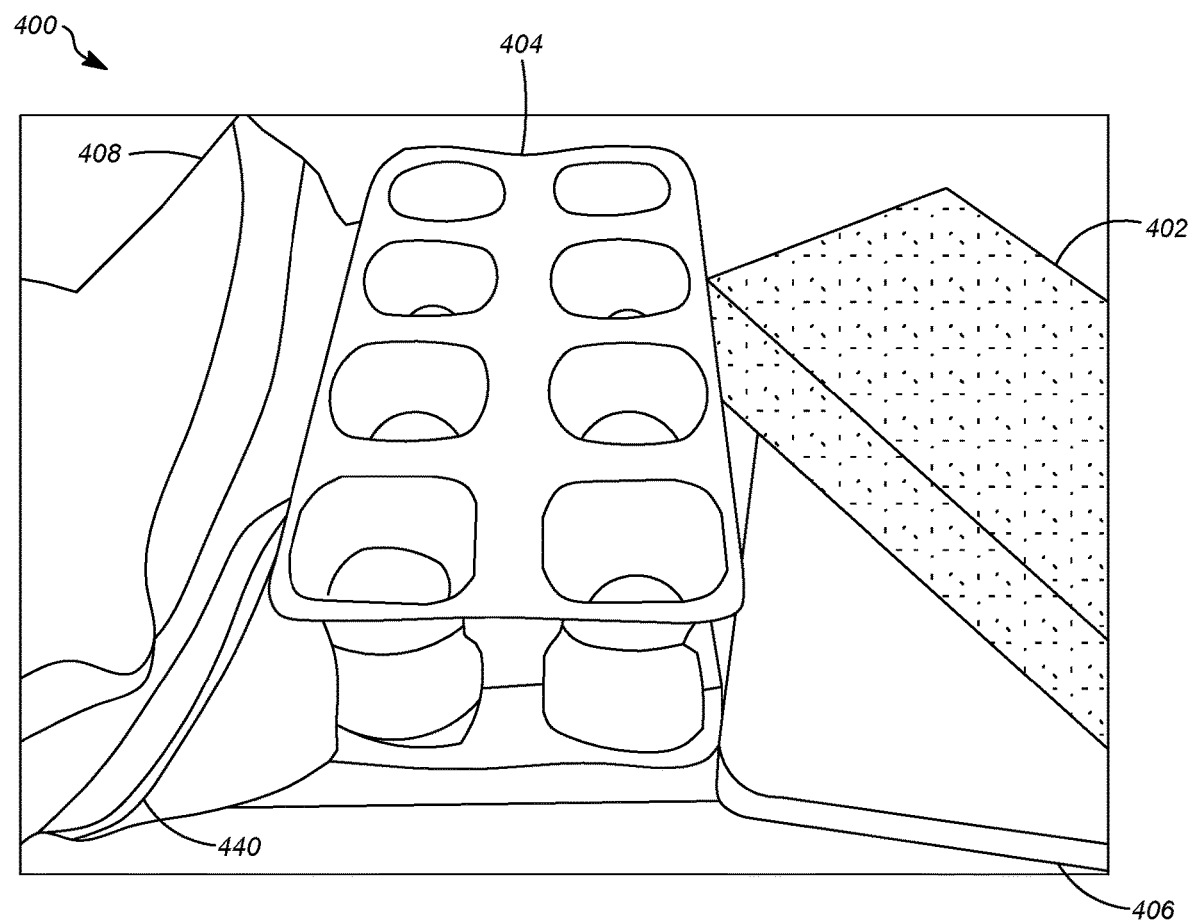
FIG. 4 illustrates a perspective view of an example layered cushion in a fully disassembled state.

FIG. 4 illustrates a perspective view of an example layered cushion 400 in a fully disassembled state. The layered cushion 400 may be disassembled into individual component layers, a cover 408, a layer of void cells 404, a foam layer 402, and a structure layer 406, to facilitate storage or cleaning. Further, each individual component layer may be treated with anti-microbial substance and/or be made of an anti-microbial material.

In one implementation, each individual component layer may be replaced and recycled without replacement of other component layers. For example, the layer of void cells 404 and the structure layer 406 may be recycled into and/or reused as a new layer of void cells and a new structure layer, respectively. Further, the cover 408 and the foam layer 402 may be recycled into a new cover and foam layer, respectively, and/or reused for other products. Because the layered cushion 400 may be recycled and is easy to clean, the layered cushion 400 may be reused in a variety of environments, such as camping or military applications. Additionally, because the layered cushion 400 is hygienic and may be easily cleaned, the layered cushion 400 may be hygienically used by multiple users.

The cover 408 couples the component layers of the layered cushion 400 together in a desired position and orientation. The cover 408 is removable so that the component layers may be separated to facilitate cleaning (e.g., via opening a hook-and-loop fastener 440 oriented along one side of the cover 408). The cover 408 may slip onto and/or wrap around the layers and it made include one or more other selectively detachable fasteners (e.g., hook-and-loop fasteners, buttons, snaps, etc.) to allow for easy removal. The cover 408 may also be machine washable or cleaned by other methods.

The layer of void cells 404 includes two opposing surfaces with one or more open cells extending from each surface. Each open cell meets an opposing open cell at a connection interface. The connection interface is perforated to facilitate cleaning. Fluids, such as water or cleaning agents, or air may be forced from the openings in the surfaces correlating to the open cells through the perforations in each connection interface to flush out contaminates. Fluids or air may be introduced at one surface of the layer of void cells 404 and flushed through the perforations in each connection interface to the opposite surface to remove particles or contaminates.

The foam layer 402 permits fluids to move freely there through. Fluids and/or cleaning agents may be flushed from one end or side of the foam layer 402 to the opposite end or side to remove particles or contaminates from the foam layer 402. Further, because the foam layer 402 does not retain fluids, the time required for the foam layer 402 to dry is reduced as compared to other foams, which prevents molds or other moisture born contaminants from emerging in the foam layer 402. The structure layer 406 is rigid and does not retain fluids. The structure layer 406 may be easily cleaned by rinsing the structure layer 406 with fluids, such as water or cleaning agents.

Figure 5:
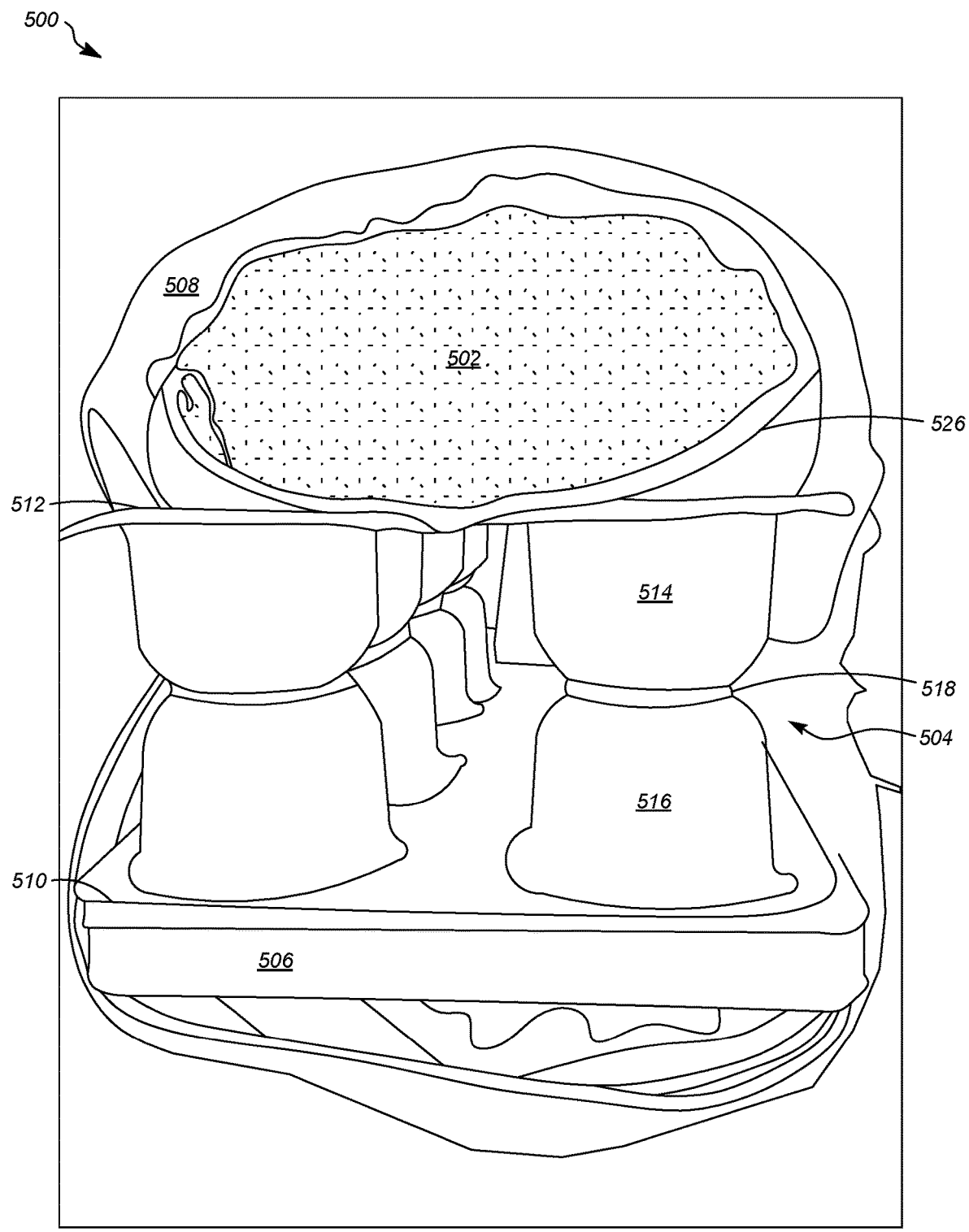
FIG. 5 illustrates an elevation view of an example layered cushion with an open cover.

FIG. 5 illustrates an elevation view of an example layered cushion 500 with an open cover 508. The layered cushion 500 includes the cover 508, a foam layer 502, a layer of void cells 504, and a structure layer 506. The cover 508 couples the individual component layers of the layered cushion 500 together in a desired position and orientation and prevents the individual component layers from deteriorating (e.g., by exposure to environmental elements). The layered cushion 500 further includes a separation layer 526 to separate the foam layer 502 from the layer of void cells 504 and to provide further structure to the layered cushion 500 and prevent the foam layer 502 from collapsing into the layer of void cells 504.

In one implementation, the cover 508 and the separation layer 526 together form a pocket. The foam layer 502 is inserted into the pocket and provides a comfortable interface for a user. The foam layer 502 is optimized to fight compression, maximize comfort, and maximize durability, permitting multiple uses. The foam layer 502 contours to the user's body to maximize comfort and reduce pressure points on the user's body. Further, the foam layer 502 contours and molds to the shape of the user's body in reaction to the user's body heat and/or weight and returns to its original shape once pressure from the user's body is removed from the layered cushion 500.

The layer of void cells 504 is disposed between the foam layer 502 and the structure layer 506. The layer of void cells 504 includes a top substantially planar surface 512 and an opposing bottom substantially planar surface 510, each surface having one or more tapered cushioning cells (e.g., cushioning cells 514 and 516) protruding there from. The cushioning cells are tapered hollow chambers that create a relatively constant force to resist deflection. While the cushioning cells depicted in FIG. 5 are generally truncated square pyramids in shape, the cushioning cells may be hemispherical, hemiellipsoidal, conical, cubical, pyramidal, cylindrical, or any other shape capable of having a hollow interior volume.

The top surface 512 links the cushioning cells extending from the top surface together, and the bottom surface 510 links the cushioning cells extending from the bottom surface together. Each cushioning cell extending from the top surface meets an opposing cushioning cell extending from the bottom surface at a connection interface. For example, cushioning cell 514 extends from the top surface 512 to meet opposing cushioning cell 516 extending from the bottom surface 510 at a connection interface 518. The connection interfaces 518 are perforated (i.e., they have one or more holes 519 passing there through) to allow for the transmission of fluids through each of the cushioning cells in the layer of void cells 504. Additionally, the surface area of the top and bottom surfaces 512 and 510 respectively corresponding to each cushioning cell is open to further permit the transmission of fluids through the layer of cushioning cells 504. The structure layer 520 is at the bottom within the cover 508 and provides rigidity to the layered cushion 500. The structure layer 520 is substantially planar and rigid and evens the surface the layered cushion 500 is placed upon to maximize comfort to the user.

Figure 6:
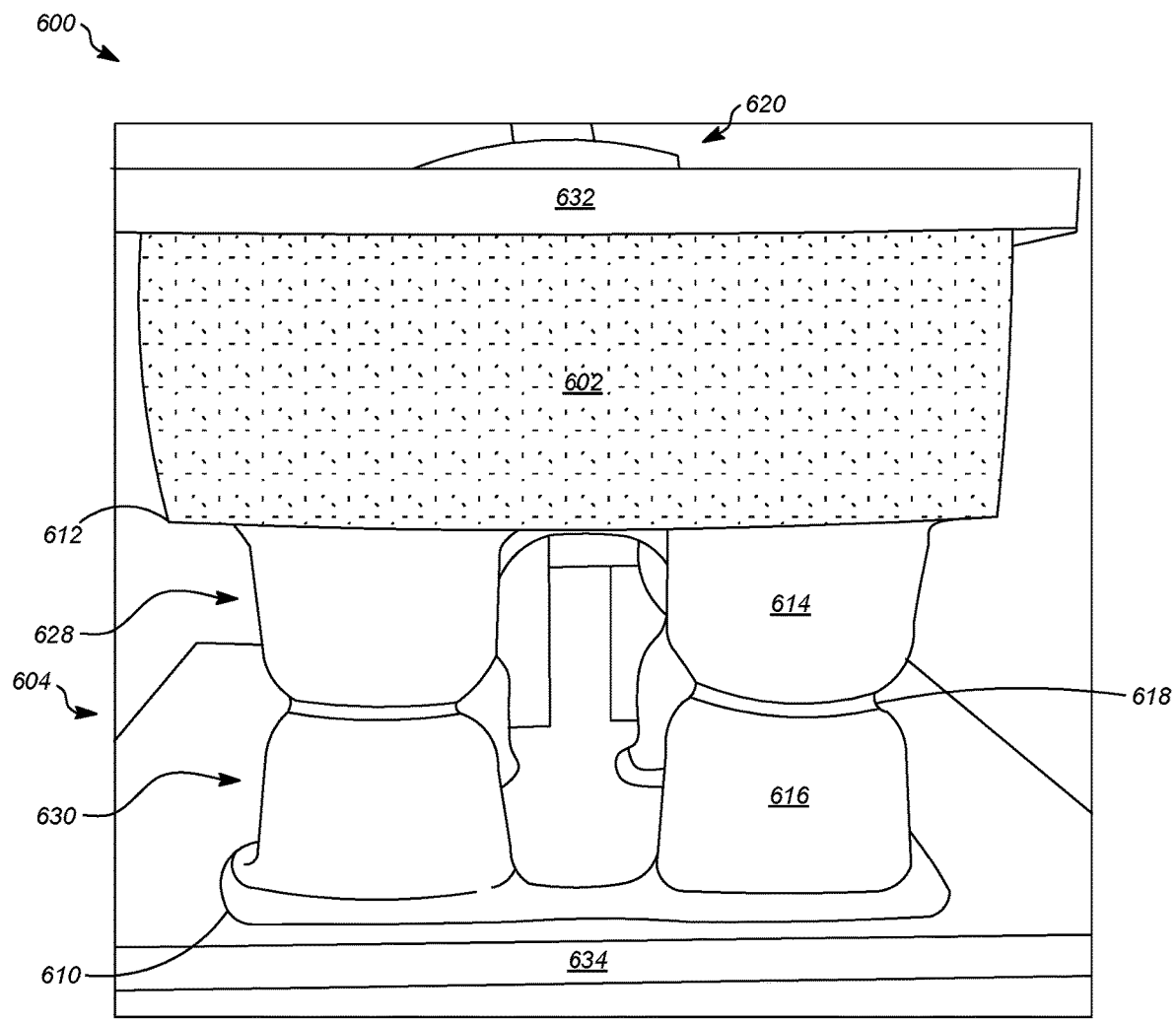
FIG. 6 illustrates an elevation view of an example layered cushion in an unloaded state.

FIG. 6 illustrates an elevation view of an example layered cushion 600 in an unloaded state. The layered cushion 600 includes a foam layer 602, a top matrix of void cells 628, and a bottom matrix of void cells 630. Both matrices of void cells 628, 630 collectively form a layer of void cells 604 as discussed in detail herein. The foam layer 602 is a porous and low-density foam, for example, a reticulated foam. The foam layer 602 has a resistance to compression set and contours to a surface applying a load or pressure without thermosetting. The layered cushion 600 excludes a cover for illustration purposes (to allow the foam layer 602 and the layer of void cells 604 to be viewed without obstruction).

The layered cushion 600 is placed in a compression test apparatus 620, which includes a top surface 632 and a bottom surface 634. The layered cushion 600 is placed between the top surface 632 and the bottom surface 634 of the compression test apparatus 620. Compression is applied to the layered cushion 600 via the compression test apparatus 620. In the implementation of FIG. 6, no compressive force is applied to the layered cushion 600.

The top matrix of void cells 628 includes a top planar layer 612 of cushioning cells (e.g., cushioning cell 614) extending from the top planar layer 612. The bottom matrix of void cells 630 includes a bottom planar layer 610 of cushioning cells (e.g., cushioning cell 616) extending from the bottom planar layer 610. Each cushioning cell extending from the top planar layer 612 meets an opposing cushioning cell extending from the bottom planar layer 610 at a connection interface. For example, the cushioning cell 614 extends from the top planar layer 612 to meet the opposing cushioning cell 616 extending from the bottom planar layer 610 at a connection interface 618.

In one implementation, the cushioning cells in the top matrix of void cells 628 and the bottom matrix of void cells 630 each have a thickness that varies over a height of the cushioning cell. For example, where the cushioning cell 614 nears the top planar layer 612, the wall thickness of the cushioning cell 614 may be greater than where the cushioning cell 614 nears the connection interface 618, or visa versa. Varying the thickness of the cushioning cells over their height may be used to yield a changing resistive force depending upon the amount of compression of the cushioning cells (i.e., yielding a positive and/or increasing spring rate). Additionally, the top matrix of void cells 628 may be a different thickness than the bottom matrix of void cells 630.

Figure 7:
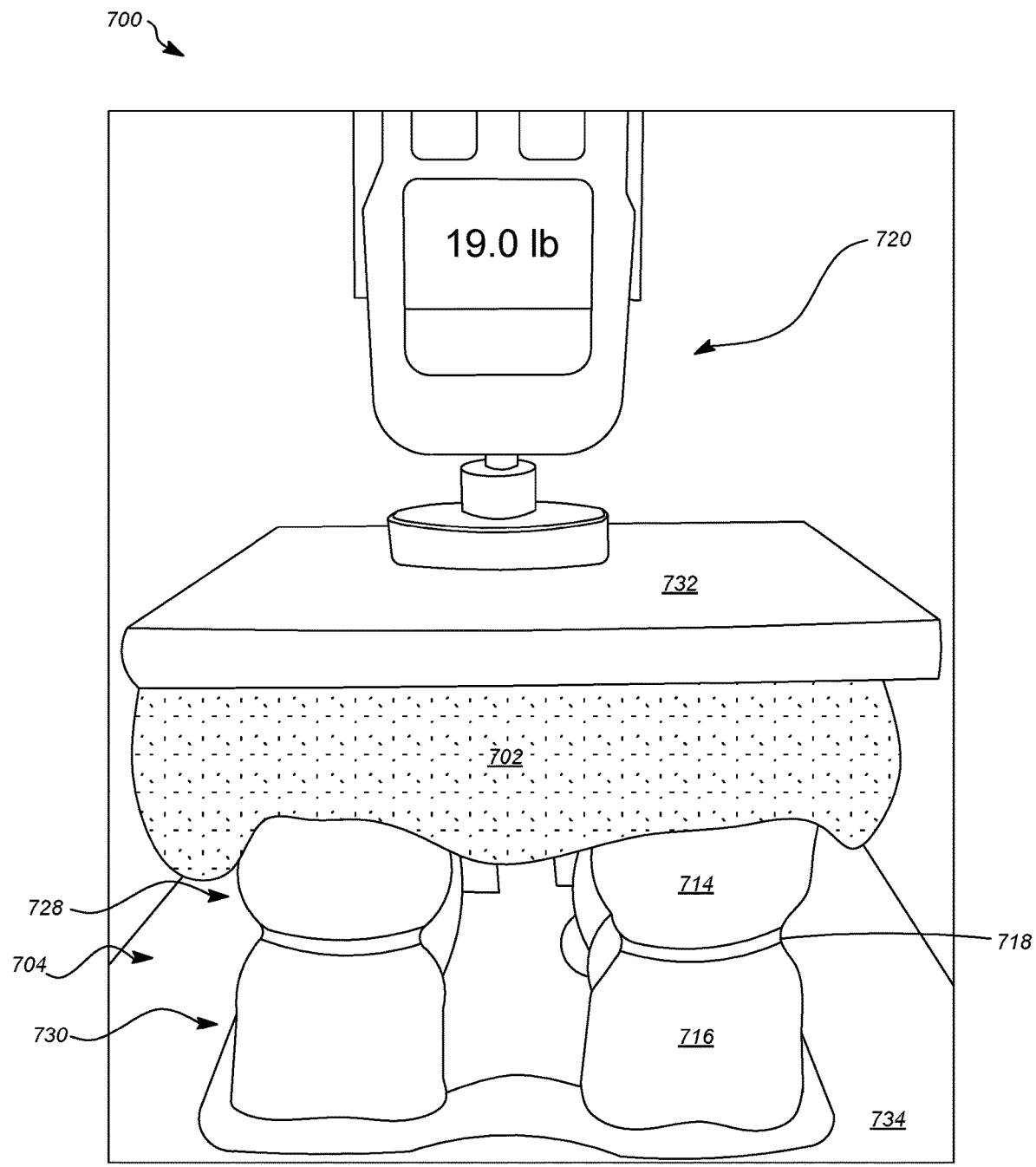
FIG. 7 illustrates an elevation view of an example layered cushion in a first partially loaded state.

FIG. 7 illustrates an elevation view of an example layered cushion 700 in a first partially loaded state. The layered cushion 700 includes a foam layer 702, a top matrix of void cells 728, and a bottom matrix of void cells 730. Both matrices of void cells 728, 730 collectively form a layer of void cells 704 as discussed in detail herein. The foam layer 702 is a porous and low-density foam, for example, a reticulated foam. The foam layer 702 has a resistance to compression and contours to a surface applying a load without thermosetting. The layered cushion 700 excludes a cover for illustration purposes (to allow the foam layer 702 and the layer of void cells 704 to be viewed without obstruction).

The top matrix of void cells 728 and the bottom matrix of void cells 730 include cushioning cells (e.g., cushioning cells 714 and 716). Each cushioning cell meets an opposing cushioning cell at a connection interface. For example, the cushioning cell 714 meets the cushioning cell 716 at a connection interface 718. The cushioning cells deform and compress as a load is applied to one or more of the void cells.

The layered cushion 700 is placed in a compression test apparatus 720, which includes a top surface 732 and a bottom surface 734. The layered cushion 700 is placed between the top surface 732 and the bottom surface 734 of the compression test apparatus 720. A load (e.g., 19.0 lb) is applied to the layered cushion 700 via the compression test apparatus 720. The foam layer 702 compresses before the top matrix of void cells 728 and the bottom matrix of void cells 730 begin to compress. The foam layer 702 contours to the shape of the top matrix of void cells 728 and begins to collapse into the cushioning cells in the top matrix of void cells 728. Because the load in the testing apparatus 720 is applied to the foam layer 702 evenly, the foam layer 702 evenly compresses. The load is insufficient to compress the cushioning cells in the top matrix of void cells 728 or bottom matrix of void cells 730. For example, cushioning cells 714 and 716 are not compressed. In another implementation, when the layered cushion 700 includes a separation layer between the foam layer 702 and the layer of void cells 704, the foam layer 702 is prevented from contouring to or collapsing into the cushioning cells in the top matrix of void cells 728.

Figure 8:
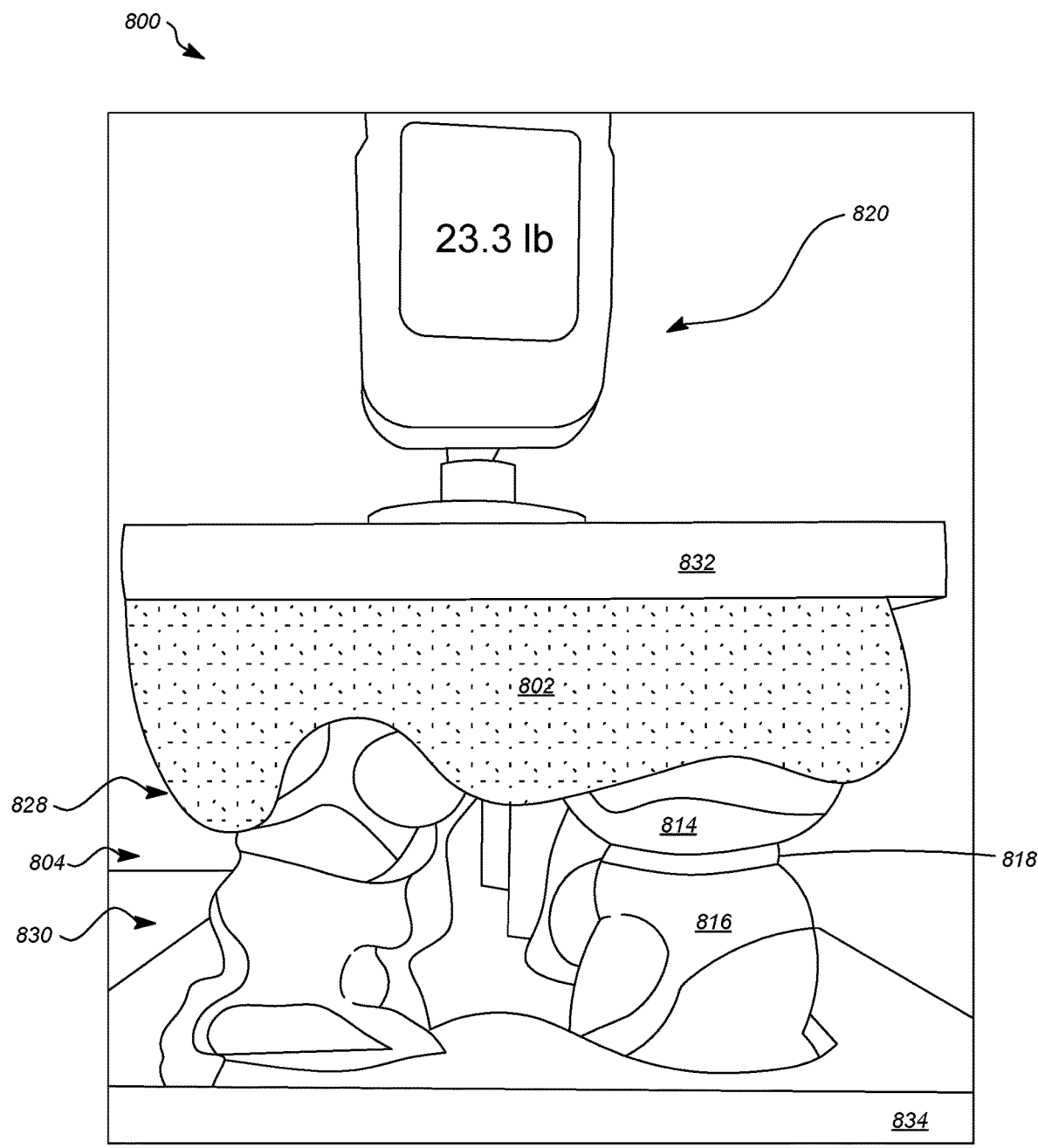
FIG. 8 illustrates an elevation view of an example layered cushion in a second partially loaded state.

FIG. 8 illustrates an elevation view of an example layered cushion 800 in a second partially loaded state. The layered cushion 800 includes a foam layer 802, a top matrix of void cells 828, and a bottom matrix of void cells 830. Both matrices of void cells 828, 830 collectively form a layer of void cells 804 as discussed in detail herein. The foam layer 802 is a porous and low-density foam, for example, a reticulated foam. The foam layer 802 has an resistance to compression and contours to a surface applying a load without thermosetting. The layered cushion 800 excludes a cover for illustration purposes (to allow the foam layer 802 and the layer of void cells 804 to be viewed without obstruction).

The top matrix of void cells 828 and the bottom matrix of void cells 830 include cushioning cells (e.g., cushioning cells 814 and 816). Each cushioning cell meets an opposing cushioning cell at a connection interface. For example, the cushioning cell 814 meets opposing the cushioning cell 816 at a connection interface 818. The cushioning cells deform and compress as a load is applied to one or more of the void cells.

The layered cushion 800 is placed in a compression test apparatus 820, which includes a top surface 832 and a bottom surface 834. The layered cushion 800 is placed between the top surface 832 and the bottom surface 834 of the compression test apparatus 820. A load (e.g., 23.3 lb) is applied to the layered cushion 800 via the compression test apparatus 820.

The testing apparatus 820 is applying a greater force than the test apparatus 720 of FIG. 7, and is compressing the layered cushion 800 further. The foam layer 802 compresses before the top matrix of void cells 828 and the bottom matrix of void cells 830 begin to collapse. The foam layer 802 contours to the shape of the top matrix of void cells 828 and collapses into and around the cushioning cells in the top matrix of void cells 828. Because the load in the testing apparatus 820 is applied to the foam layer 802 evenly, the foam layer 802 evenly compresses.

The top matrix of void cells 828 and bottom matrix of void cells 830 each collapse to create a relatively constant force to resist deflection. For example, the cushioning cells 808 and 812 in combination with the foam layer 802 individually compress and conform to a user's body with an even force on the user's body to maximize comfort and reduce the potential for pressure points on the user's body. In another implementation, when the layered cushion 800 includes a separation layer between the foam layer 802 and the layer of void cells 804, the foam layer 802 is prevented from contouring to or collapsing into the cushioning cells in the top matrix of void cells 828.

In various implementations, the top matrix of void cells 828 has a lower resistance to deflection and thus collapses before the bottom matrix of void cells 830, which has a higher resistance to deflection. However, in other implementations, the bottom matrix of void cells 830 has a lower resistance to deflection and thus collapses before the top matrix of void cells 828. In yet other implementations, the top matrix of void cells 828 and the bottom matrix of void cells 830 have the same or similar resistance to deflection and thus collapse simultaneously or nearly simultaneously.

Figure 9:
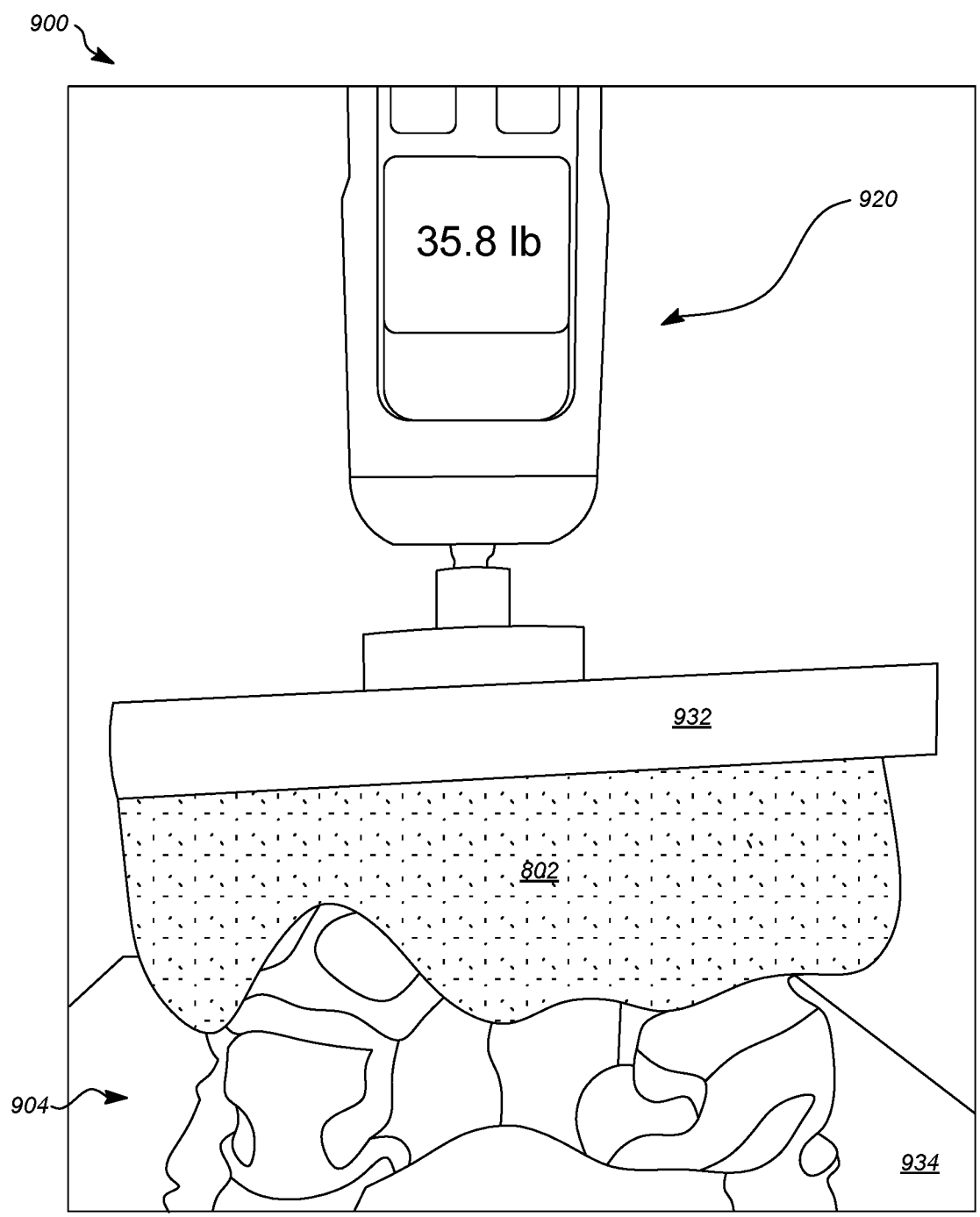
FIG. 9 illustrates an elevation view of an example layered cushion in a heavily loaded state.

FIG. 9 illustrates an elevation view of example layered cushion 900 in a third heavily loaded state. The layered cushion 900 includes a foam layer 902 and a layer of void cells 904. The layer of void cells 904 is arranged in a top matrix and a bottom matrix, which are indistinguishable in the heavily loaded state depicted in FIG. 9. The layer of void cells 904 includes multiple cushioning cells that deform and compress as a load is applied to the layer of void cells 904.

The foam layer 902 is a porous and low-density foam, for example, a reticulated foam. The foam layer 902 has a resistance to compression and contours to a surface applying a load without thermosetting. The layered cushion 900 excludes a cover for illustration purposes (to allow the foam layer 902 and the layer of void cells 904 to be viewed without obstruction).

The layered cushion 900 is placed in a compression test apparatus 920, which includes a top surface 932 and a bottom surface 934. The layered cushion 900 is placed between the top surface 932 and the bottom surface 934 of the compression test apparatus 920. A load (e.g., 35.8 lb) is applied to the layered cushion 900 via the compression test apparatus 920.

The testing apparatus is applying a greater force than the test apparatus 914 of FIG. 8, and is compressing the layered sleep system components 900 further. The foam layer 902 compresses before the layer of void cells 904 collapses. The foam layer 902 contours to the shape of the layer of void cells 904 and collapses into and around the cushioning cells in the layer of void cells 904. Because the load in the testing apparatus 920 is applied to the foam layer 902 evenly, the foam layer 902 evenly compresses. Further, the layer of void cells 904 is almost fully collapsed and the individual void cells are no longer distinguishable from one another.

Figure 10:
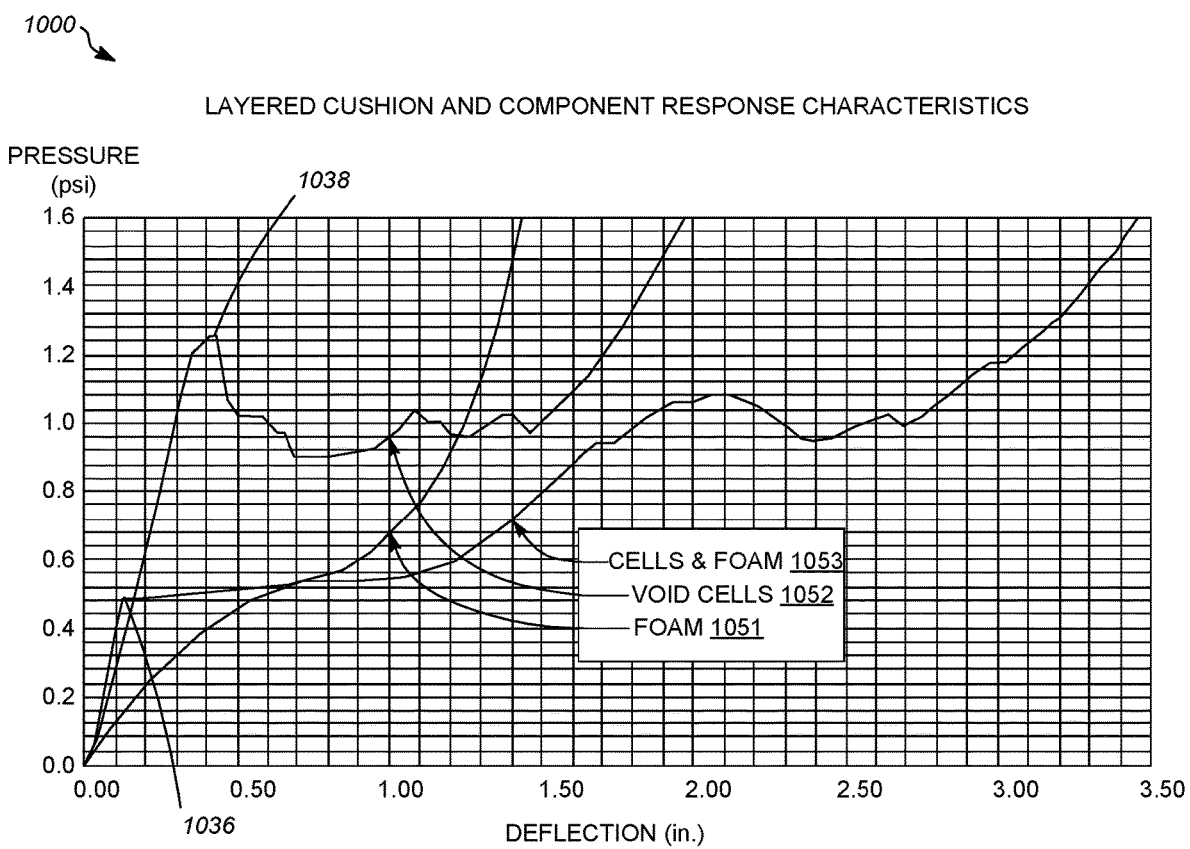
FIG. 10 illustrates an example pressure over deflection curve for component and system response characteristics of an example layered cushion.

FIG. 10 illustrates an example pressure over deflection curve 1000 for component and system response characteristics of an example layered cushion. The graph 1000 illustrates the relationship between pressure (in pounds per square inch) and deflection (in inches) of a 2 inch foam layer (1051), a 4 inch layer of void cells (1052), and a layered cushion system including both the 2 inch foam layer and the 4 inch layer of void cells (1053).

The graph 1000 illustrates a difference in activation and support pressure between the three curves. The 2-inch foam layer has an initial yield point 1036 that provides lower pressure support to a user's body. The lower pressure support of the 2-inch foam layer maximizes comfort and interface pressure reduction. The layer of void cells has a higher initial yield point 1038, which provides displacement under higher loads, which in turn provides support for larger and/or more protruding features of the user's body (e.g., the user's shoulders or hips).

The layered cushion system including both the 2-inch foam layer component and the layer of void cells component combines the low and high-pressure support advantages of the 2-inch foam layer and the layer of void cells. As a result, curve 1053 does not have a distinct initial yield point and overall has a smoother pressure-deflection profile than curves 1051 and 1052. Accordingly, the layered cushion system combines the low and high pressure support of the 2-inch foam layer component and the layer of void cells component to provide a layered cushion that contours to and supports the user's body and that is soft and comfortable to the user.

Figure 11:
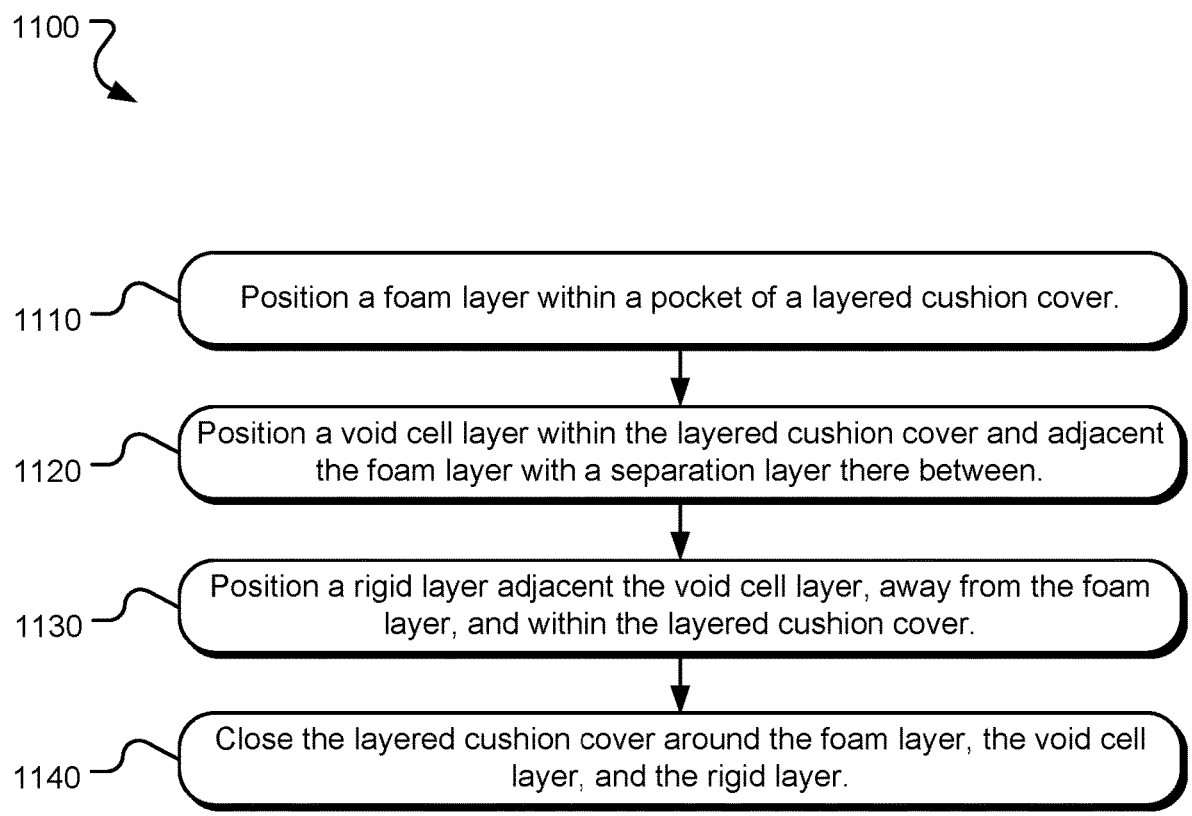
FIG. 11 illustrates example operations for assembling a layered cushion according to the presently disclosed technology.

FIG. 11 illustrates example operations 1100 for assembling a layered cushion according to the presently disclosed technology. A first positioning operation 1110 positions a foam layer within a pocket of a layered cushion cover. In one implementation, the foam layer is made of a fluid permeable foam with a pore size large enough to facilitate transmission of fluids through the foam layer with relative ease. The foam layer collapses under a load and provides a user a comfortable interface with the layered cushion. In one implementation, the layered cushion cover is made of a permeable flexible material (e.g., fabric or mesh). Further, the pocket may be formed contiguously with the layered cushion cover and made of the same material as the layered cushion cover.

A second positioning operation 1120 positions a void cell layer adjacent the foam layer within the layered cushion cover with a separation layer there between. The void cell layer includes multiple cushioning cells or support units extending from one or more substantially planar surfaces. The individual cushioning cells collapse under a load, and the void cell layer collapses under a relatively greater load than the foam layer. This provides the user additional support. The separation layer may be formed contiguously with the layered cushion cover and made of the same material as the layered cushion cover or it may be a separate structure attached to the layered cushion cover. Further, the separation layer may be the interior portion of the aforementioned pocket.

A third positioning operation 1130 positions a rigid layer adjacent the void cell layer, away from the foam layer, and within the layered cushion cover. The rigid layer provides a structural foundation for the layered cushion and may be made of any rigid material (e.g., wood, plastic, metal). In some implementations, a separate pocket within the layered cushion cover receives the rigid layer. In other implementations, no rigid layer is included in the layered cushion because the layered cushion is intended to be placed on a rigid surface.

A closing operation 1140 closes the layered cushion cover around the foam layer, the void cell layer, and the rigid layer. This envelops and secures the layers in a desired position and orientation within the layered cushion cover. In one implementation, the layered cushion cover is equipped with selective fasteners (e.g., hook-and-loop, buttons, snaps, etc.) oriented along at least 1 side of the layered cushion cover. The layers are inserted through the open side(s) of the layered cushion cover and the layered cushion cover is selectively closed around the layers.

Figure 12:
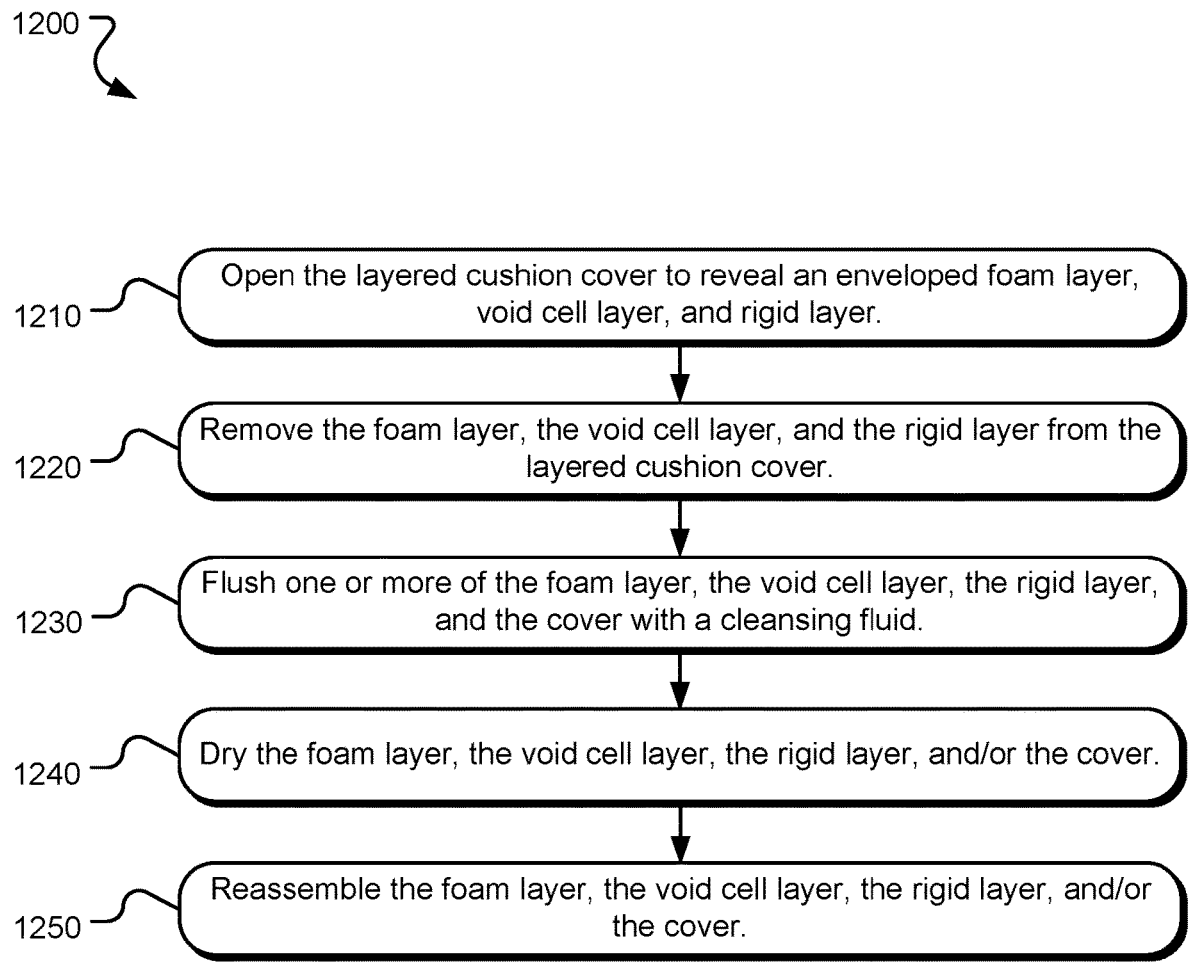
FIG. 12 illustrates example operations for cleaning a layered cushion according to the presently disclosed technology.

FIG. 12 illustrates example operations 1200 for cleaning a layered cushion according to the presently disclosed technology. An opening operation 1210 opens the layered cushion cover to reveal an enveloped foam layer, void cell layer, and rigid layer within the layered cushion cover. In one implementation, the opening operation 1210 is accomplished by selectively detaching selective fasteners (e.g., hook-and-loop, buttons, snaps, etc.) oriented along at least 1 side of the layered cushion cover.

A removing operation 1220 removes the foam layer, the void cell layer, and the rigid layer from the layered cushion cover. In one example implementation, the removing operation 1220 may be performed by merely physically pulling each of the foam layer, the void cell layer, and the rigid layer from the layered cushion cover. A flushing operation 1230 flushes one or more of the foam layer, the void cell layer, the rigid layer, and the cover with a cleansing fluid. The cleansing fluid may include water and one or more cleansing and/or anti-microbial agents (e.g., soaps and chemicals) to facilitate cleansing of the layered cushion. More specifically, the cleansing fluid may pass over and through holes and/or pores in the foam layer, the void cell layer, the rigid layer, and/or the cover to flush contaminants from the foam layer, the void cell layer, the rigid layer, and/or the cover.

A drying operation 1240 dries the foam layer, the void cell layer, the rigid layer, and/or the cover. The drying operation 1240 may be performed on one or more of the layers that was flushed in the flushing operation 1230. The drying operation 1240 further may be performed merely by ambient temperature evaporation or by the application of heat and/or forced air to the foam layer, the void cell layer, the rigid layer, and/or the cover to facilitate the evaporation. A reassembling operation 1250 reassembles the foam layer, the void cell layer, the rigid layer, and/or the cover. In one implementation, the reassembling operation 1250 may be performed using the operations 1100 of FIG. 11.

The logical operations making up the embodiments of the invention described herein are referred to variously as operations, steps, objects, or modules. Furthermore, it should be understood that logical operations may be performed in any order, adding and/or omitting steps as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet other embodiments without departing from the recited claims.

What is claimed is:

1. A layered cushion comprising:
   a fluid-permeable foam layer;
   a thermoplastic elastomeric void cell layer including at least a first layer of open void cells formed exclusively in a single sheet of resiliently deflectable material, each open void cell having an open end and a distal end, the void cell layer having a plurality of drainage holes present in the distal end of the open void cells opposite the foam layer providing a fluid channel through the void cell layer;
   a uniformly flexible and fluid-permeable separation layer interleaved between the foam layer and the void cell layer and in contact with the first layer of open void cells, the separation layer extending across the open ends of the open void cells of the void cell layer; and
   a fluid-permeable cover configured to envelop the void cell layer, the foam layer, and the separation layer.

2. The layered cushion of claim 1, wherein the first layer includes at least two rows and two columns of open void cells.

3. The layered cushion of claim 1, wherein the void cell layer further includes a second layer of open void cells including at least two rows and two columns of open void cells, wherein each open void cell of the first layer is axially aligned with a corresponding open void cell of the second layer.

4. The layered cushion of claim 1, wherein the cover constrains the first layer of open void cells in a fixed position relative to the foam layer when enveloping the first layer of open void cells and the foam layer.

5. The layered cushion of claim 1, wherein the foam layer substantially collapses at a lower pressure than the void cell layer collapses.

6. The layered cushion of claim 1, wherein each drainage hole is positioned at an interface between an open void cell of the first layer of open void cells and an open void cell of a second layer of open void cells of the void cell layer.

7. The layered cushion of claim 1, wherein the separation layer adjoins the cover.

8. The layered cushion of claim 1, wherein the open void cells are indentations in a polymeric sheet.

9. The layered cushion of claim 1, wherein a SAG factor between the foam layer and the void cell layer is approximately 2.

10. A method of assembling a layered cushion comprising:
    positioning a fluid-permeable foam layer and a thermoplastic elastomeric void cell layer on opposite sides of a uniformly, flexible and fluid-permeable separation layer such that the separation layer contacts an open end of a first layer of open void cells of the void cell layer and substantially prevents the foam layer from collapsing into the open ends of the open void cells of the void cell layer, wherein the first layer of open void cells is formed exclusively in a single sheet of resiliently deflectable, non-fluid permeable material, and has a plurality of drainage holes present in distal ends of the open void cells opposite the open ends, the drainage holes providing a fluid channel through the void cell layer;
    placing the positioned foam layer, separation layer, and the void cell layer within a fluid-permeable cover; and
    closing the cover to envelop the foam layer, the separation layer, and the void cell layer.

11. The method of claim 10, wherein the foam layer, the void cell layer, and the cover are removable from one another.

12. The method of claim 10, wherein the void cell layer further includes a second layer of open void cells and wherein each drainage hole in an open void cell of the first layer is aligned with a corresponding drainage hole in an open void cell of the second layer.

13. The method of claim 10, wherein the separation layer is formed continuously with the cover.

14. The method of claim 10, wherein the cover constrains the foam layer in a selected position and orientation relative to the void cell layer when enveloping the foam layer.

15. The layered cushion of claim 10, wherein the open void cells are indentations in a polymeric sheet.

16. A washable layered mattress comprising:
    a fluid-permeable foam layer;
    a thermoplastic elastomeric void cell layer including at least a first layer of open void cells formed exclusively in a first sheet of resiliently deflectable material, the void cell layer having a plurality of drainage holes present in the open void cells opposite the foam layer providing a fluid-permeable channel through the void cell layer, the first layer including at least two rows and two columns of open void cells;
    a uniformly flexible and fluid-permeable separation layer interleaved between the foam layer and the void cell layer and in contact with the first layer of open void cells, wherein the separation layer extending across the open ends of the open void cells and substantially prevents the foam layer from collapsing into the open void cells of the void cell layer; and
    a fluid-permeable cover configured to envelop the void cell layer, the foam layer, and the separation layer.

17. The washable layered mattress of claim 16, wherein the separation layer is formed continuously with the cover.

18. The washable layered mattress of claim 16, wherein the cover constrains the foam layer in a selected position and orientation relative to void cell layer when enveloping the foam layer.

19. The washable layered mattress of claim 16, wherein the separation layer adjoins the cover.

20. The washable layered mattress of claim 16, wherein the open void cells are indentations in a polymeric sheet.

21. The washable layered mattress of claim 16, wherein a SAG factor between the foam layer and the void cell layer is approximately 2.

* * * * *